(12) United States Patent
Zaldivar et al.

(10) Patent No.: US 11,376,782 B2
(45) Date of Patent: Jul. 5, 2022

(54) METHOD OF MODIFYING A 3D-PRINTED POLYMER STRUCTURE

(71) Applicant: The Aerospace Corporation, El Segundo, CA (US)

(72) Inventors: Rafael J. Zaldivar, Redondo Beach, CA (US); Hyun I. Kim, Brea, CA (US); Sara M. Gustafson, Highlands Ranch, CO (US); Tait DeWitt McLouth, Los Angeles, CA (US)

(73) Assignee: THE AEROSPACE CORPORATION, El Segundo, CA (US)

( * ) Notice: Subject to any disclaimer, the term of this patent is extended or adjusted under 35 U.S.C. 154(b) by 93 days.

(21) Appl. No.: 16/782,460

(22) Filed: Feb. 5, 2020

(65) Prior Publication Data

US 2021/0237337 A1 Aug. 5, 2021

(51) Int. Cl.
*B29C 59/14* (2006.01)
*C09J 5/02* (2006.01)
*B29C 64/188* (2017.01)
*B33Y 40/20* (2020.01)
*B33Y 80/00* (2015.01)

(52) U.S. Cl.
CPC ............ *B29C 59/14* (2013.01); *B29C 64/188* (2017.08); *B33Y 40/20* (2020.01); *B33Y 80/00* (2014.12); *C09J 5/02* (2013.01); *B29C 2059/145* (2013.01)

(58) Field of Classification Search
CPC ..... B29C 64/10; B29C 64/106; B29C 64/112; B29C 64/118; B29C 64/124; B29C 64/188; B29C 65/48; B29C 59/14; B29C 59/145; B29C 59/147; B29C 2059/145; B33Y 80/00; B33Y 40/20; C09J 5/02
See application file for complete search history.

(56) References Cited

U.S. PATENT DOCUMENTS

| | | | | |
|---|---|---|---|---|
| 8,586,149 | B2 * | 11/2013 | Holubka | B05D 7/144 427/558 |
| 8,632,651 | B1 * | 1/2014 | Hicks | C09J 5/02 156/272.2 |
| 9,862,140 | B2 * | 1/2018 | Lewicki | B29C 64/118 |

* cited by examiner

*Primary Examiner* — Michael P Wieczorek
(74) *Attorney, Agent, or Firm* — Duane Morris LLP

(57) ABSTRACT

A method of modifying a 3D-printed polymer structure is provided. The method can include providing an initial 3D-printed polymer structure having at least one exposed surface; treating the exposed surface of the initial 3D-printed polymer structure with plasma to obtain a treated 3D-printed polymer structure having a treated surface; administering an adhesive to the treated surface of the treated 3D-printed polymer structure; and contacting a complementary 3D-printed polymer structure with the treated surface of the treated 3D-printed polymer structure to obtain a modified 3D-printed polymer structure.

17 Claims, 7 Drawing Sheets plasma exposures →

METHOD OF MODIFYING A 3D-PRINTED POLYMER STRUCTURE

FIELD

The disclosure relates generally to a method of modifying a 3D-printed polymer structure, and more particularly, to a method of repairing or augmenting a 3D-printed polymer structure.

BACKGROUND

Additive manufacturing, or 3D printing, is a popular prototyping technology. Basic desktop 3D printers are commonly used to produce low quality parts for one-off prototypes that can easily be discarded or reprinted. Such one-off parts are typically made using inexpensive materials in order to test, for example, the feasibility of the design. Recently, a demand for complex and high-performance 3D printed polymer structures has arisen. In some cases, for example, 3D-printed parts span over 40 meters in length; and 3D printed parts have been designed for sophisticated applications including satellite buses and turbine blades. The thermoplastics used to make 3D-printed polymer structures have also become more complex, as they are often selected based on the thermal and/or mechanical requirements of the application. Accordingly, high quality 3D-printed parts are difficult and expensive to prepare. Such parts are not intended to be reprinted or discarded. Because there are no well-established process for augmenting or fixing defects on a 3D-printed polymer structure, a process of repairing or augmenting such structures is needed.

SUMMARY

In various embodiments, a method of modifying a 3D-printed polymer structure is provided. In some embodiments, the method can comprise providing an initial 3D-printed polymer structure comprising at least one exposed surface; treating the exposed surface of the initial 3D-printed polymer structure with plasma to obtain a treated 3D-printed polymer structure comprising a treated (activated) surface; administering an adhesive to the treated surface of the treated 3D-printed polymer structure; and bonding a complementary 3D-printed polymer structure to the treated surface with adhesive to obtain a modified 3D-printed polymer structure.

In some embodiments, the method can further comprise treating an exposed surface of the complementary 3D-printed polymer structure with plasma to obtain a treated complementary 3D-printed polymer structure with a treated (activated) surface, and then bonding the treated surface of the treated complementary 3D-printed polymer structure to the treated (activated) surface of the treated 3D-printed structure with adhesive.

In various embodiments, a method of modifying a 3D-printed polymer structure is provided. In some embodiments, the method can comprise providing an initial 3D-printed polymer structure comprising at least one exposed surface; treating the exposed surface of the initial 3D-printed polymer structure with plasma to obtain a treated 3D-printed polymer structure comprising a treated (activated) surface; administering an adhesive to the treated surface of the treated 3D-printed polymer structure; measuring a contact angle between the treated surface of the treated 3D-printed polymer structure and the adhesive; measuring the concentration of oxygen-containing functional groups on the treated surface of the treated 3D-printed polymer structure; and bonding a complementary 3D-printed polymer structure to the treated surface with the adhesive to obtain a modified 3D-printed polymer structure.

In some embodiments, the method can further comprise treating an exposed surface of the complementary 3D-printed polymer structure with plasma to obtain a treated complementary 3D-printed polymer structure with a treated (activated) surface, and then bonding the treated surface of the treated complementary 3D-printed polymer structure to the treated (activated) surface of the treated 3D-printed structure with adhesive.

Additional features and advantages will be set forth in the detailed description which follows, and in part will be apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments and are incorporated into and constitute a part of this specification. The drawings illustrate the various embodiments described herein and, together with the description, explain the principles and operations of the claimed subject matter.

DETAILED DESCRIPTION

Figure 1:
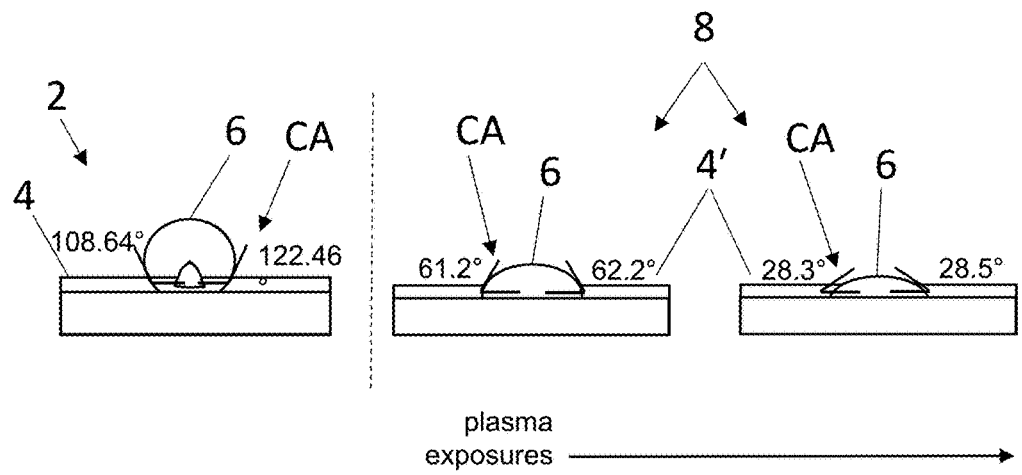
FIG. 1 is a diagram showing the contact angles of a liquid on the surface of a 3D-printed polymer structure, in accordance with some embodiments of the present disclosure.

Reference will now be made in detail to embodiments of the present disclosure, examples of which are illustrated in the accompanying drawings. Whenever possible, the same reference numerals will be used throughout the drawings to refer to the same or like parts. However, this disclosure may be embodied in many different forms and should not be construed as limited to the embodiments set forth herein.

In various embodiments, a method of modifying a 3D-printed polymer structure is provided. In some embodiments, the 3D-printed polymer structure comprises a defect and the modification is a repair (for example, a patch). In some embodiments, the 3D-printed polymer structure is defect-free and requires a design modification after its initial fabrication. In some embodiments, the 3D-printed polymer structure is defect-free and the modification comprises an augmentation (i.e., adding a feature to the structure).

The method is not limited to any particular polymer; i.e., the method is generally applicable to most polymers used in additive manufacturing. In some embodiments, the 3D-printed polymer structure comprises a thermoplastic or thermoset. In some embodiments, for example, the polymer is nylon, polylactic acid (PLA), acrylonitrile butadiene styrene (ABS), resin, polyethylene terephthalate glycol (PETG), thermoplastic polyurethane (TPU), acrylonitrile styrene acrylate (ASA), polyetherimide (PEI), etc. Other materials are contemplated. For example, in some embodiments, the polymer structure is plastic that has been hybridized with other materials, including, for example, wood, steel, aluminum, molded plastic, etc. In such embodiments, the polymer structure can have, for example, a metal component integrated into the printed polymer structure.

In some embodiments, the 3D-printed polymer structure comprises a thermoplastic having a low-energy surface with high chemical resistance. In some embodiments, the surface is an exposed surface (for example, the surface is an exterior surface that is exposed to the atmosphere). In some embodiments, the surface of the thermoplastic polymer structure is hydrophobic. Generally, a hydrophobic thermoplastic polymer structure has poor wettability (i.e., the ability of a liquid to cover the surface) and poor bondability with respect to typical adhesives. The ability of an adhesive, for example, to cover (wet) the surface of the 3D-printed polymer structure for bonding happens when the surface energy of the structure is greater than the surface energy of the adhesive. Because high strength adhesives have high surface energy and plastics have low surface energy, the surface of a 3D-printed polymer structure requires activation to facilitate effective modification or augmentation. In this context, an activated surface means the surface has improved wettability and/or bondability with respect to the surface before it was activated.

In some embodiments, the method of modifying the 3D-printed polymer structure comprises treating the 3D-printed polymer structure with plasma to activate an exposed surface thereof. In such embodiments, the surface of the 3D-printed polymer structure is activated by plasma functionalization. Without being bound to a particular theory, activating the surface of the 3D-printed polymer structure comprises a chemical change whereby the plasma (e.g., oxygen plasma) expels ionic species from the surface of the polymer structure. The chemical change can also involve the insertion of oxygen atoms into the polymer structure to create oxygen functional groups (for example, moieties comprising a carboxyl, alkoxy, carbonyl, carbonate, etc.). In such embodiments, the hydrophobic nature of the treated surface is converted to a hydrophilic surface with an appropriate surface energy for bonding to an adhesive. In some embodiments, the plasma treatment protocol is adjusted to maximize the wettability and bondability, and to maximize the oxygen-containing surface chemical functional groups.

In some embodiments, the plasma is a non-thermal (cold temperature) plasma. In such embodiments, the plasma treatment can utilize atmospheric-pressure plasma or a reduced pressure (vacuum) plasma. For example, the plasma can be administered at a pressure ranging from about 0.01 psi to about 50 psi, from about 0.01 psi to about 20 psi, from about 0.01 psi to about 15 psi, etc. All ranges are interchangeable, combinable, and inclusive of specific pressures (for example, 14.7 psi). Depending on the size of the 3D-printed polymer structure, atmospheric-pressure plasma may be preferred. The plasma-treating protocol can comprise any suitable gases. For example, in some embodiments the active gas is air or oxygen, and the carrier gas is helium or argon. In some embodiments, the plasma device comprises an adjustable intensity. In such embodiments, the intensity of the plasma can be configured to provide a treated surface having particular properties that are advantageous to bonding with an adhesive.

As provided herein, the plasma surface treatment conditions, including the number and duration of passes required to maximize bond strength without causing degradation, are important for achieving uniform stress distribution in the activated region of the treated surface. Accordingly, there are at least two concerns with plasma-treating a 3D-printed polymer structure: bond strength (the interface between the surface of the 3D-printed polymer structure and the adhesive) and structure strength (the resistance of the modified 3D-printed polymer structure to fracture when stressed).

The activated region of a 3D-printed polymer structure is not particularly limited. In some embodiments, the activated region ranges from about 0.1 mm to about 5 meters. Alternatively, the activated region ranges from about 0.1 mm to about 0.5 meters, or from about 1 mm to about 100 mm, or from about 2 mm to about 10 mm. All ranges are interchangeable and combinable.

In some embodiments, the plasma surface treatment conditions include a plasma exposure duration ranging from about 1 second to about 1 hour. Alternatively, the plasma exposure duration can range from about 30 seconds to about 30 minutes, or about 1 minute to about 5 minutes. All ranges are interchangeable and combinable.

In some embodiments, the plasma surface treatment conditions include a series of passes whereby the 3D-printed polymer structure is exposed to plasma. In some embodiments, the number of passes ranges from 1 to 100. Alternatively, the number of passes ranges from 2 to 60, or 5 to 20. In some embodiments, at least 5, or at least 10, or at least 15 plasma passes are used. All ranges are interchangeable and combinable. In some embodiments, the series of passes have a particular time of plasma exposure, as discussed above, and a particular time between subsequent plasma exposures (i.e., a rate of exposures).

Wettability can be assessed through several methods. For example, a drop of liquid with a known surface energy can be applied to the surface of the 3D-printed polymer structure, and the contact angle of the liquid drop surface can be measured, with respect to the structure surface, to determine the surface energy of the 3D-printed polymer structure.

FIG. 1 illustrates the relationship between the amount of plasma exposure and the wettability of a surface as determined by measuring the contact angle of the liquid drop surface. The arrow under the right two images in FIG. 1 indicates that as the amount of plasma treatment increases (for example, time, intensity, number of passes, rate for each pass, or combinations thereof), the wettability of the surface increases and the contact angle between the adhesive and the surface decreases. In particular, the image on the left in FIG. 1 shows a droplet of liquid (6) failing to wet an untreated surface (4) (control) of the 3D printed polymer structure (2). The contact angles (CA) between the liquid (6) and the surface (4) of the control structure were measured to be 108.64° and 122.46°. However, after the surface (4) of the 3D-printed polymer structure (8) was exposed to plasma treatments to provide modified surface (4'), the contact angles (CA) significantly decreased to 61.2° and 62.2° (middle image). And, after further plasma exposure, the contact angles (CA) decreased again to 28.3° and 28.5°, as shown in the image on the right.

In some embodiments, after the exposed surface of the 3D-printed polymer structure has been activated with plasma, a complementary 3D-printed polymer structure can be bonded to the activated surface of the 3D-printed polymer structure with adhesive. In some embodiments, the 3D-printed polymer structure and the complementary 3D-printed polymer structure are manufactured with the same polymer. In some embodiments, the 3D-printed polymer structure and the complementary 3D-printed polymer structure are manufactured with different polymers. In some embodiments, the complementary 3D-printed polymer structure is activated with plasma to form a treated complementary 3D-printed polymer structure before bonding the complementary 3D-printed polymer structure to the activated surface of the 3D-printed polymer structure with adhesive.

Without being bound by a particular theory, the bond strength at the interface of the plasma-treated 3D-printed polymer structure, the adhesive, and the complementary 3D-printed polymer structure can be correlated to the extent of chemical bonding between the two substrates. Generally, the more oxygen functional groups on the treated surface that chemically react with the surface of the complementary 3D-printed polymer structure, the stronger the resulting modified 3D-printed polymer structure will be.

Figure 2A:
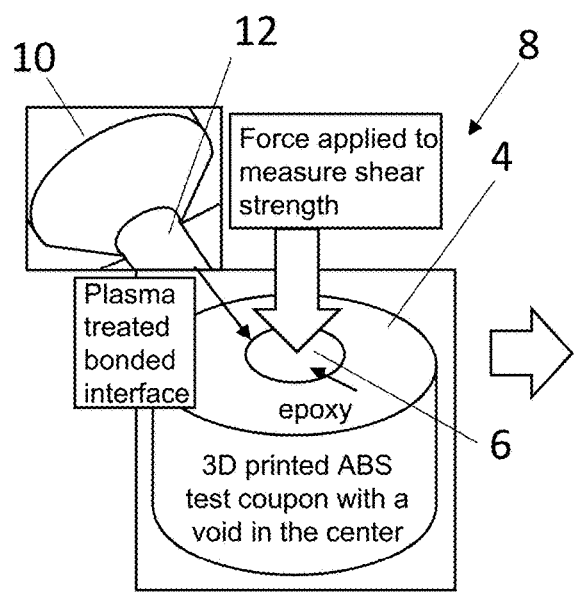
FIG. 2A is a diagram showing the general method of modifying a 3D-printed polymer structure with plasma, in accordance with some embodiments of the present disclosure.

A method of modifying a 3D-printed polymer structure is generally shown in FIG. 2A. The figure shows a plasma device (10) treating the surface of a 3D-printed polymer structure (4) with plasma (12). The 3D-printed polymer structure (4) was manufactured with a center hole therethrough, which was then treated with the plasma (12) to form an activated surface (4') in the center hole. Adhesive (6) (for example, epoxy) was then applied to the center hole having the activated surface (4') to form a modified 3D-printed polymer structure (8) comprising a bonded interface.

To evaluate the bond strength of the modified 3D-printed polymer structure (8) (i.e., bond strength at the interface between the activated surface (4') in the center hole and the adhesive (6) due to plasma-induced chemical activation), a series of 3D-printed polymer structures were plasma-treated on the surface of the center hole over various exposure times (0, 1, 2, and 5 minutes). Then, adhesive (6) was applied to the plasma-treated surface of the center hole, and the modified 3D-printed polymer structures were tested for strength by applying a force in the direction of the center hole, as indicated with the vertical arrow shown in FIG. 2A. The interfacial strength of the modified 3D-printed polymer structure (i.e., resistance to fracture) was determined by measuring the force required to separate the adhesive from the 3D-printed polymer structure.

Figure 2B:
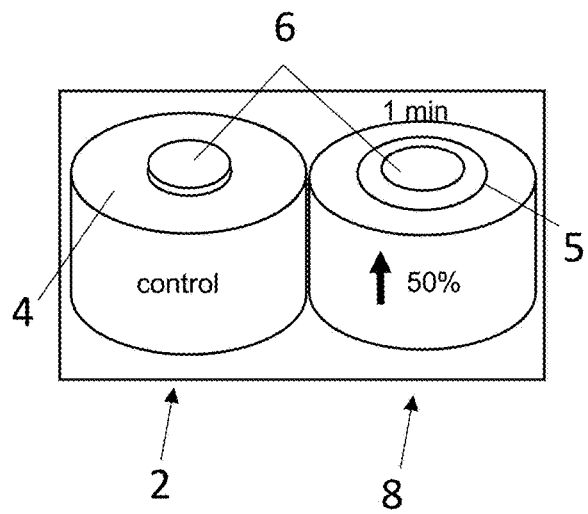
FIG. 2B is a diagram showing two modified 3D-printed polymer structures after strength testing.

Two examples of the modified 3D-printed polymer structures, after testing, are shown in FIG. 2B. The untreated structure (2) shown on the left was not treated with plasma prior to filling the center hole with adhesive (6) (control). As shown, the adhesive (6) was dislodged from the center hole during strength testing and it maintained the shape of the center hole. The treated structure (8) shown on the right was treated with plasma for 1 minute prior to filling the center hole with adhesive (6). As shown, the adhesive (6) created a bond with the activated surface of the 3D-printed polymer structure (8), and during testing, the adhesive and bonded portion of the structure (5) were collectively dislodged together.

Figure 2C:
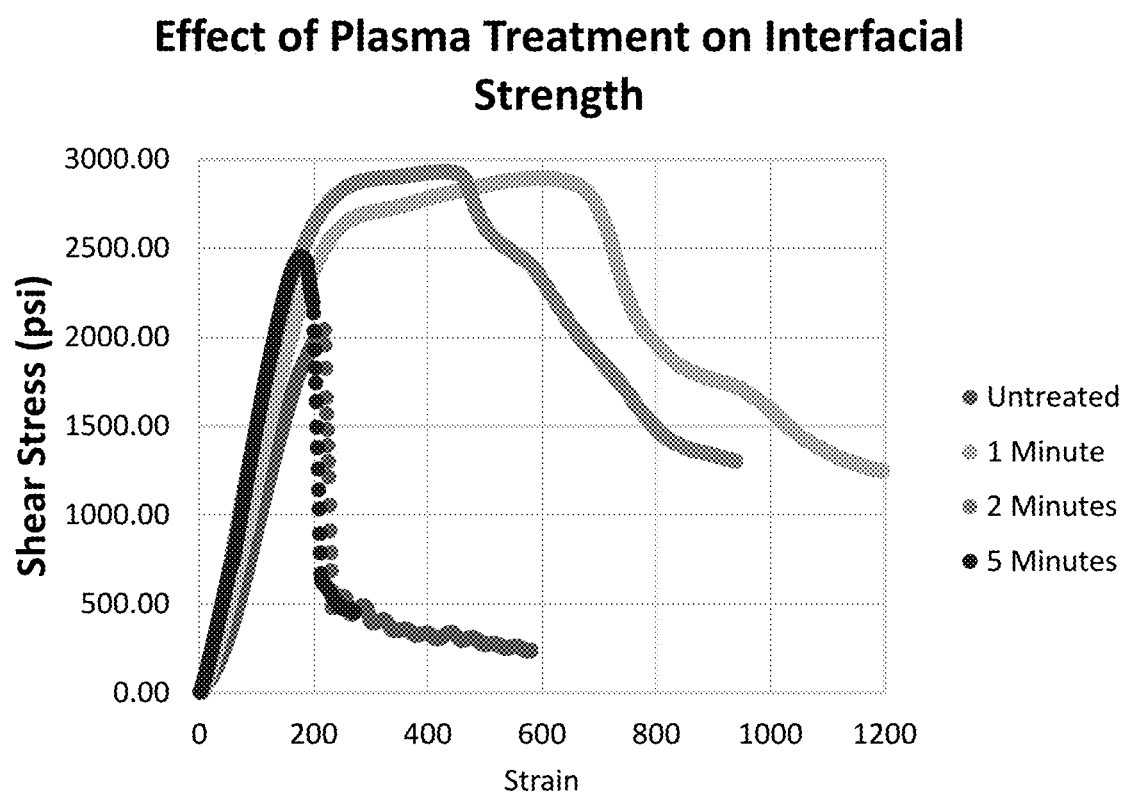
FIG. 2C is a graphical representation of the stress-strain curve measured for a series of 3D-printed polymer structures, in accordance with some embodiments of the present disclosure.

FIG. 2C is a graph showing the stress-strain curve measured for the series of 3D-printed polymer structures, where stress is recorded in pounds per square inch (psi) and strain is recorded as percentage of deformation (%). The untreated (control) structure withstood about 2041 psi of force before fracture at about 0.04%. The structure treated for 1 minute withstood almost 2893 psi of force before fracture at 0.10%. The structure treated for 2 minutes withstood almost 2930 psi of force before fracture at about 0.07%. The structure treated for 5 minutes withstood about 2452 psi of force before fracture at about 0.03%. This data reveals a couple of important aspects of the method. In some embodiments, the plasma-treated structure can have a substantially improved adhesive bond strength that is approximately 50% stronger than an untreated structure. In some embodiments, plasma-treating a structure for too long may lead to modest improvement in adhesive bond strength, but that bond strength is not adjusted to a maximum potential strength.

Figure 3A:
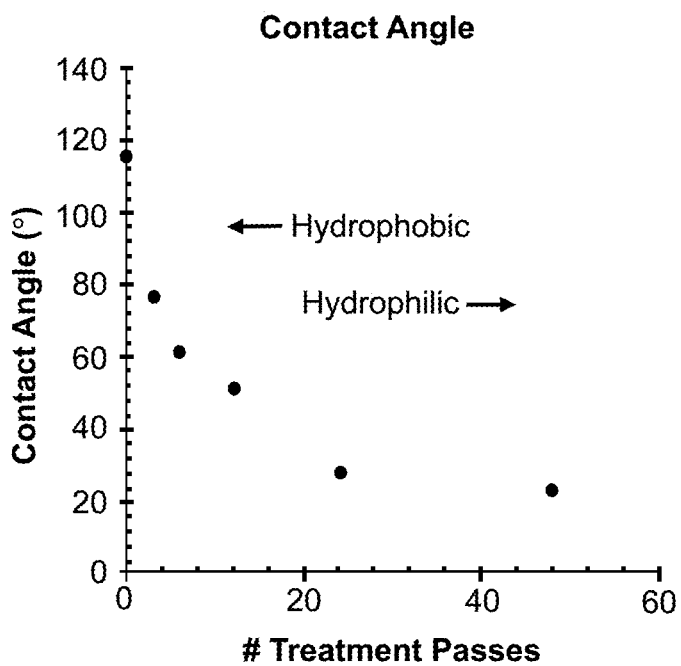
FIG. 3A is a graphical representation of the measured contact angle based on the number of plasma-treatment passes a structure is subjected to, in accordance with some embodiments of the present disclosure.

FIG. 3A is a graphical representation of the measured contact angle based on the number of plasma-treatment passes a particular 3D-printed polymer structure is subjected to. The contact angle indicates the wettability of the surface. The substrate was a 1"×1"×0.25" polymer block having droplets of water placed on the surface to measure contact angle. An untreated 3D-printed polymer structure is very hydrophobic, and the contact angle measured for that system was about 115°. As the number of treatments increased from 4 to 24, the contact angle decreased almost linearly to about 28°. The contact angle continued to decrease with additional treatments, however, the decrease was modest, as the contact angle after 48 passes was about 22°.

Figure 3B:
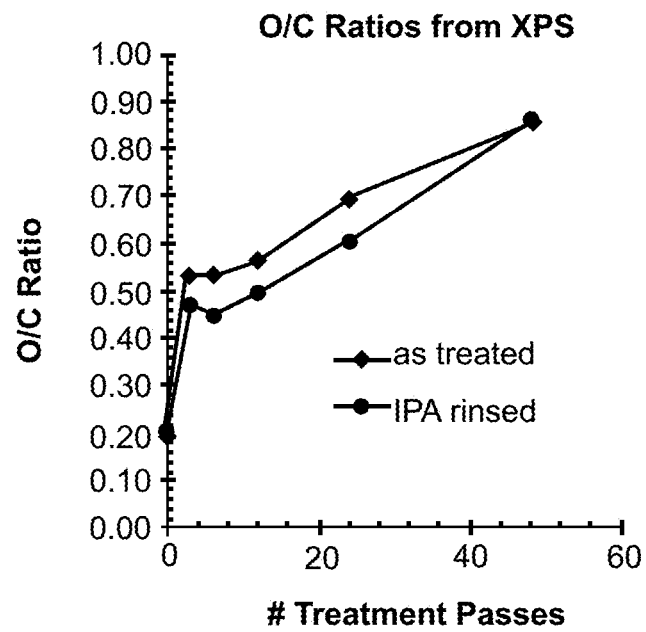
FIG. 3B is a graphical representation of the level of oxygen insertion into the plasma-treated 3D-printed polymer structure, in accordance with some embodiments of the present disclosure.

The hydrophilic conversion in FIG. 3A can be further explained on a molecular level. FIG. 3B is a graphical representation of the level of oxygen insertion into the surface of the plasma-treated 3D-printed polymer structure. FIG. 3B shows that as the number of treatments increased from zero to 48 passes, the oxygen to carbon ratio (0/C) increased from about 0.20 to about 0.85. The figure shows a significant increase after the first few passes (from 0.20 to about 0.55), and then additional increases after about 24 passes (from about 0.55 to about 0.70) and after 48 passes (about 0.70 to about 0.85). As the concentration of oxygen increases, the number of available bonding locations with an adhesive increases.

Figure 3C:
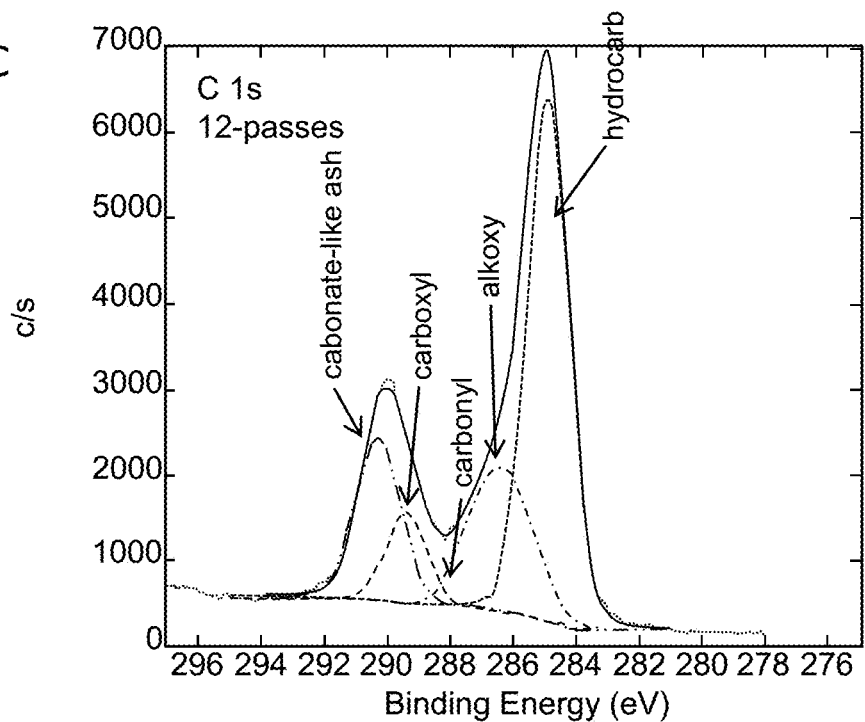
FIG. 3C is a graphical representation of the various functional groups in a plasma-treated 3D-printed polymer structure after 12 plasma passes, in accordance with some embodiments of the present disclosure.
Figure 3D:
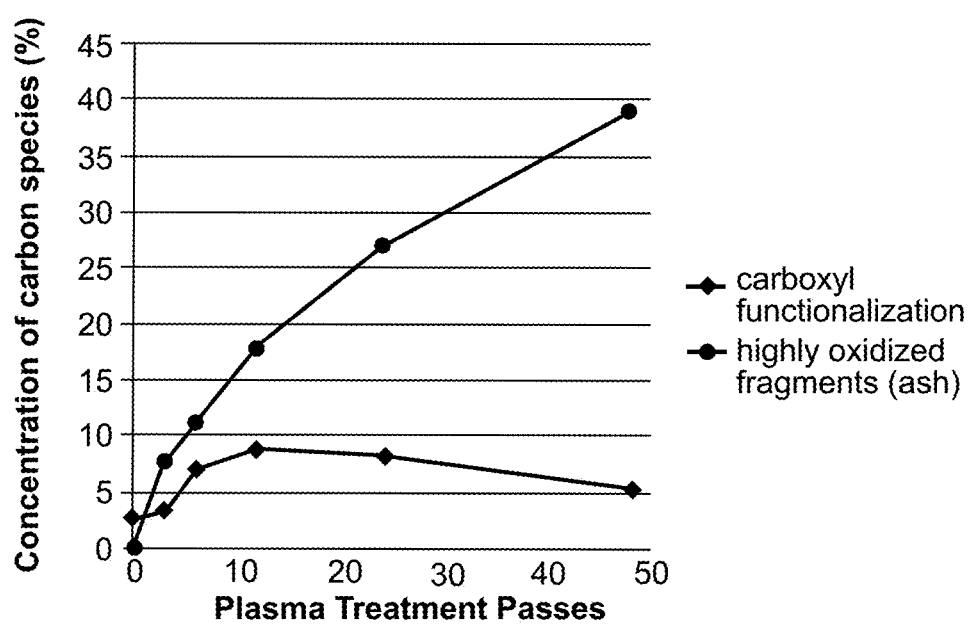
FIG. 3D is a graphical representation of the concentrations of carboxyl functionalization and highly oxidized fragments relative to the number of plasma passes, in accordance with some embodiments of the present disclosure.

FIG. 3C is a graphical representation of the intensity (c/s=counts per second) relative to binding energy (eV) for various functional groups in a plasma-treated 3D-printed polymer structure after 12 plasma passes. This information can be used to adjust the plasma treatment protocol to maximize the amount of relevant surface functional groups. For example, FIG. 3C shows carboxyl, carbonyl, alkoxy, hydrocarbon, and carbonate-like ash groups. The concentration of these functional groups can be correlated to the number of passes. For example, FIG. 3D shows the concentrations of carboxyl functionalization (lower plot) and highly oxidized fragments (ash; upper plot) relative to the number of passes. Maximizing the concentration of carboxyl functionalization correlates to increased bond strength. As such, FIG. 3D shows that after about 12 plasma treatment passes, the carboxyl functionalization begins to decline.

In some embodiments, measuring the contact angle will reveal the wettability of the plasma-treated surface, and the functionalization measurements will reveal the bond strength of the plasma-treated surface. Thus, in some embodiments, the method of modifying the 3D-printed polymer structure disclosed herein comprises treating a 3D-printed structure having a specific polymer with a plasma treatment protocol developed to increase wettability and maximize bond strength without causing degradation, wherein the protocol is based on a preliminary analysis of the specific polymer and adhesive. The preliminary analysis can include measuring an oxygen to carbon ratio of the initial 3D-printed polymer structure and/or measuring the concentration of oxygen-containing functional groups on the surface of the initial 3D-printed polymer structure and/or the treated 3D-printed polymer structure.

In some embodiments, the 3D-printed polymer structure comprises a defect (for example, a printing error or damage obtained during use of the structure) and a repair is needed so that the structure does not have to be reprinted. In such embodiments, Applicant has surprisingly discovered that the shape of a 3D-printed polymer patch can have a substantial effect on the recovered strength of the modified 3D-printed polymer structure relative to a control. In some embodiments, the strength recovery is at least 30%, or at least 50%, or at least 75%, or at least 90%. In some embodiments, the strength recover is in a range of about 10% to about 100%, or about 30% to about 95%, or about 50% to about 90%. All ranges are interchangeable and combinable.

Figure 4A:
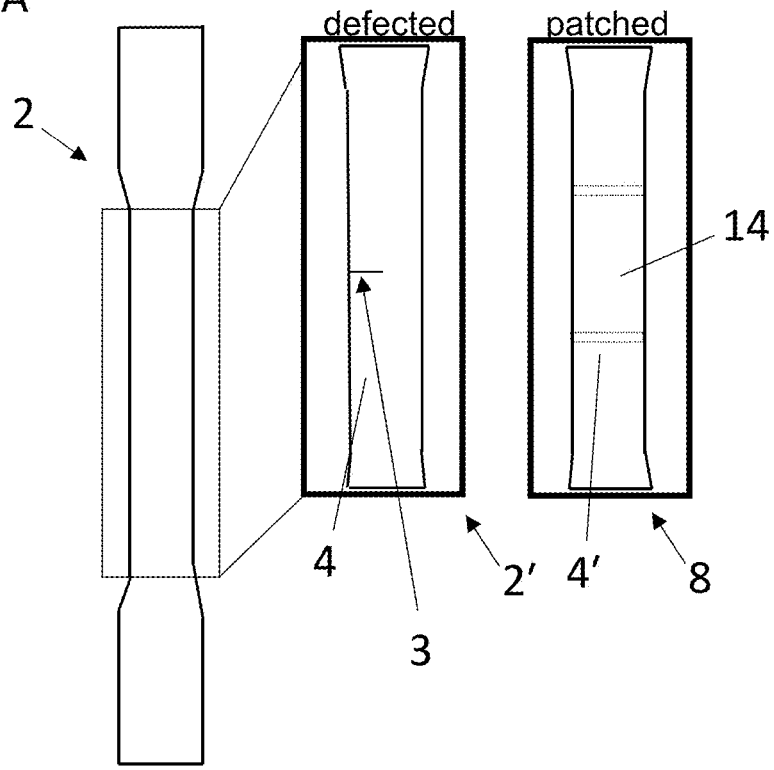
FIG. 4A is a diagram of a 3D printed polymer structure having a dog-bone shape, a defected 3D printed polymer structure, and a 3D printed polymer structure modified with a rectangular-shaped patch, in accordance with some embodiments of the present disclosure.

Example 1. FIG. 4A shows a 3D printed polymer structure (2) having a dog-bone shape. Structures were printed with and without any intentional defects to measure the tensile strength of the structures. The defected 3D printed polymer structure (2'), shown in the middle of FIG. 4A, was printed with a defect (3) on its surface (4) to simulate damaged hardware. A rectangular-shaped patch (complementary structure 14) was printed out of the same polymer, and adhered to the exposed surface (4) of the defected 3D printed polymer structure (2'), after activation of the surface with a plasma treatment protocol. The rectangular shape is comparable to the inner section of the dog-bone (i.e., they are both rectangular). For this experiment, the plasma treatment utilized oxygen as the reactive gas, at a flowrate of 0.45 L/min, and helium as the carrier gas, at flowrate of 30 L/min. The working distance was 1 mm, and the power was set to 120 W. Treatment duration was adjusted through the number of passes of the plasma head at a rate of 25.4 mm/s. Samples were exposed to 0, 3, 6, 12, 24, or 48 passes prior to characterization. The 3D-printed polymer structure (2), the defected 3D printed polymer structure (2'), and the modified 3D-printed polymer structure (8) were each tested for tensile strength.

Figure 4B:
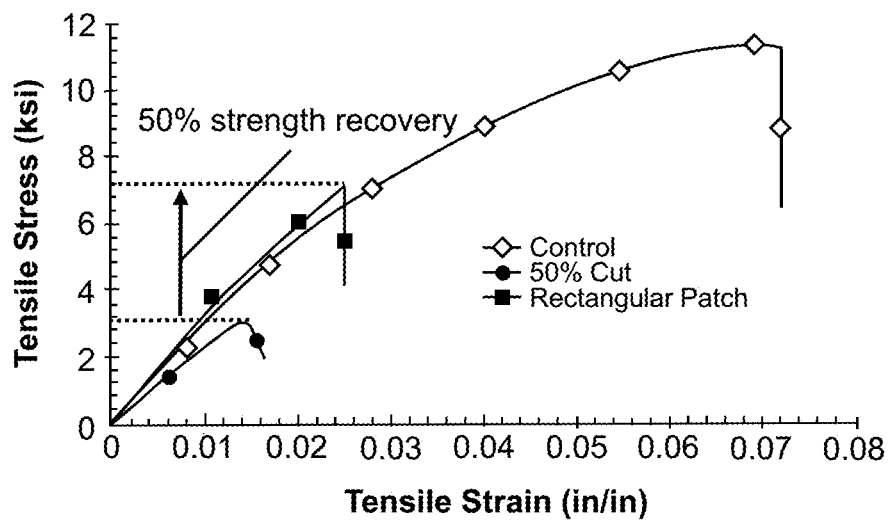
FIG. 4B is a graphical representation of the bond strength measured for each of the structures in FIG. 4A.

FIG. 4B is a graphical representation of the bond strength measured for each of the 3D-printed polymer structure (2), the defected 3D printed polymer structure (2'), and the modified 3D-printed polymer structure (8). The 3D-printed polymer structure (2), serving as a control withstood a force of about 11.5 ksi before fracture. The defected 3D printed polymer structure (2') withstood a force of only about 3 ksi before fracture. And the modified 3D-printed polymer structure (8) withstood a force of about 6.4 ksi before fracture. Accordingly, in this experiment, the defect (3) reduced the tensile strength by 70%, severely impairing its load-bearing ability, and the modified 3D-printed polymer structure (8) having a rectangular shape recovered about 50% of the strength observed for the control.

Figure 5A:
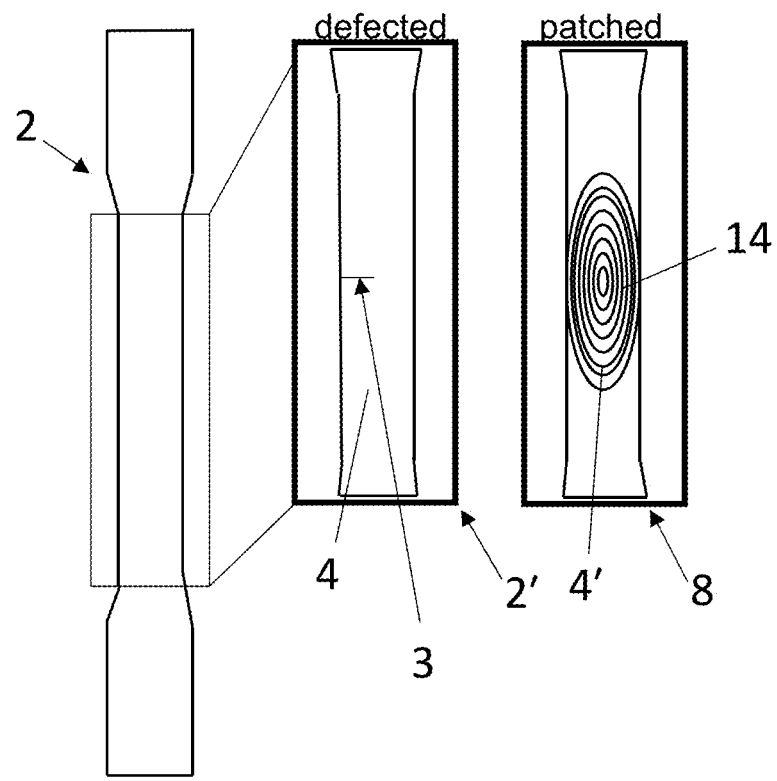
FIG. 5A is a diagram of a 3D printed polymer structure having a dog-bone shape, a defected 3D printed polymer structure, and a 3D printed polymer structure modified with an elliptical-shaped patch, in accordance with some embodiments of the present disclosure.
Figure 5B:
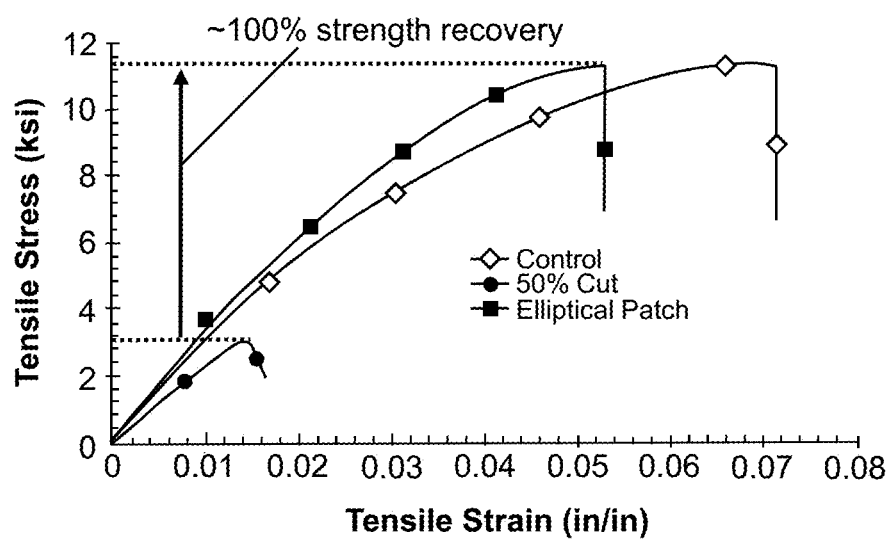
FIG. 5B is a graphical representation of the bond strength measured for each of the structures in FIG. 5A.

Example 2. Another experiment was conducted with the identical parameters used in Example 1, except that an elliptical patch (complementary structure 14) was used. As shown in the right image of FIG. 5, the elliptical patch (14) was used to cover the defect (3) after activation of the surface with a plasma treatment protocol. FIG. 5B is a graphical representation of the bond strength measured for each of the samples. In this case, the modified 3D-printed polymer structure (8) withstood a force of about 11.5 ksi before fracture. Accordingly, in this experiment, the defect (3) reduced the tensile strength by 70%, severely impairing its load-bearing ability, and the modified 3D-printed polymer structure (8) having an elliptical shape recovered about 100% of the strength observed for the control.

Figure 6A:
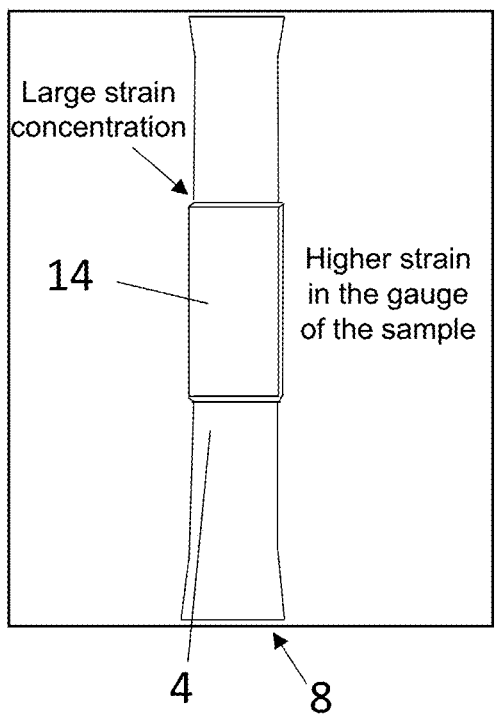
FIG. 6A is a Digital Image Correlation for the 3D printed polymer structure modified with a rectangular-shaped patch in FIG. 4A.
Figure 6B:
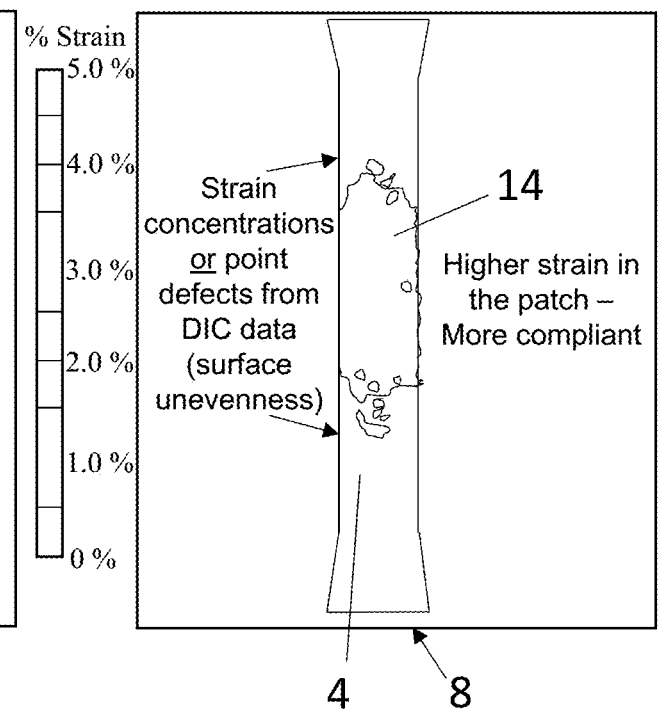
FIG. 6B is a Digital Image Correlation for the 3D printed polymer structure modified with an elliptical-shaped patch in FIG. 5A.

In FIGS. 6A and 6B, the effect of the patch design on a modified 3D-printed polymer structure (8) is shown. In particular, the figures show the strain field at 100% load (i.e., just before fracture) using Digital Image Correlation (DIC). A legend for the strain concentrations is shown between FIGS. 6A and 6B, where the bottom is colored blue and indicates 0% strain, the middle is colored green and indicates about 2-3% strain, and the top is colored red and indicates 5% strain.

In FIG. 6A, the imaging shows an abrupt change in color, from dark green on the surface (4) of the original structure of the 3D-printed polymer structure, to dark blue at the top and bottom edges of the rectangular patch (14). In addition, a little red can be observed at the top edge of the patch. During testing, the patch (14) failed at the edges of the patch where the abrupt color change is observed. This imaging indicates that the rectangular shape of the patch led to about 50% of the recovered strength observed for the modified 3D-printed polymer structure (8).

In FIG. 6B, the imaging shows very subtle changes in color, with light green to yellowish-green on the surface (4) of the original structure of the 3D-printed polymer structure, and the patch (14) is generally green with light blue areas mixed throughout and a few red spots near three of the patch edges. This imaging indicates that the elliptical shape of the patch was better suited than the rectangular-shaped patch to evenly distribute the load, which led to about 100% of the recovered strength observed for the modified 3D-printed polymer structure (8).

In this disclosure, a protocol has been developed to determine the plasma surface treatment conditions necessary to maximize bond strength without causing degradation, as well as a repair patch design that achieves uniform stress distribution in the repair region. In a repair, the patch design must be adjusted to attain the full-strength recovery by avoiding stress concentration around the edge. With the novel repair technique, any local defects or damages incorporated in larger structures can be rectified without the need to re-print the entire part from scratch. Since a re-print does not necessarily guarantee a defect-free build, multiple re-prints may be needed before an acceptable part is made. Therefore, features in this disclosure can save significant time and materials through a targeted, surgical repair of the damaged area in a 3D-printed polymer structure.

Exemplary embodiments of the systems and methods are described above in detail. The systems and methods are not limited to the specific embodiments described herein, but rather, components of the systems and/or steps of the method may be utilized independently and separately from other components and/or steps described herein. For example, the system may also be used in combination with other systems and methods, and is not limited to practice with only a system as described herein. Rather, the exemplary embodiment can be implemented and utilized in connection with many other systems.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of modifying an initial 3D-printed polymer structure, comprising:
   providing an initial 3D-printed polymer structure comprising at least one exposed surface comprising a localized printing defect;
   treating the exposed surface of the initial 3D-printed polymer structure with plasma to obtain a treated 3D-printed polymer structure comprising a treated surface;
   administering an adhesive to the treated surface of the treated 3D-printed polymer structure; and
   contacting a complementary 3D-printed polymer structure with the treated surface of the treated 3D-printed polymer structure to obtain a modified 3D-printed polymer structure.

2. The method of claim 1, wherein the complementary 3D-printed polymer structure is a repair patch and the repair patch is positioned over the localized printing defect.

3. The method of claim 2, wherein the modified 3D-printed polymer structure comprises a strength recovery of at least 50% relative to the initial 3D-printed polymer structure comprising no defects on the exposed surface.

4. The method of claim 3, further comprising, prior to the contacting step, treating an exposed surface of the complementary 3D-printed polymer structure with plasma to obtain a treated complementary 3D-printed structure.

5. The method of claim 1, wherein the initial 3D-printed polymer structure and the complementary 3D-printed polymer structure are comprised of the same polymer.

6. The method of claim 1, wherein the plasma is non-thermal, atmospheric-pressure plasma.

7. The method of claim 6, wherein the atmospheric-pressure plasma is provided by a plasma-treatment protocol comprising oxygen or air as an active gas.

8. The method according to claim 1, wherein the complementary 3D-printed polymer structure is an augmentation and is positioned over the localized printing defect.

9. The method of claim 1, further comprising:
   measuring a contact angle between the treated surface of the treated 3D-printed polymer structure and the adhesive; and
   measuring the concentration of oxygen-containing functional groups on the treated surface of the treated 3D-printed polymer structure.

10. The method of claim 9, further comprising, prior to treating the exposed surface of the initial 3D-printed polymer structure with plasma to obtain a treated 3D-printed polymer structure comprising a treated surface, measuring an oxygen to carbon ratio of the initial 3D-printed polymer structure and measuring the concentration of oxygen-containing functional groups on the surface of the initial 3D-printed polymer structure.

11. The method of claim 10, further comprising, prior to measuring the concentration of oxygen-containing functional groups on the treated surface of the treated 3D-printed polymer structure, measuring the oxygen to carbon ratio of the treated surface of the treated 3D-printed polymer structure.

12. The method of claim 11, wherein the modified 3D-printed polymer structure comprises a strength recovery of at least 50% relative to the initial 3D-printed polymer structure comprising no defects on the exposed surface.

13. The method of claim 9, wherein the initial 3D-printed polymer structure and the complementary 3D-printed polymer structure are comprised of the same polymer.

14. The method of claim 9, wherein the plasma is non-thermal, atmospheric-pressure plasma.

15. The method of claim 14, wherein the atmospheric-pressure plasma is provided by a plasma-treatment protocol comprising oxygen or air as an active gas.

16. The method according to claim 9, wherein the complementary 3D-printed polymer structure is an augmentation.

17. The method of claim 1, wherein the complementary 3D-printed polymer structure is a repair patch having an outer profile configured to avoid stress concentration around an edge of the repair patch.

* * * * *